(12) United States Patent
Ando et al.

(10) Patent No.: US 8,289,584 B2
(45) Date of Patent: Oct. 16, 2012

(54) IMAGE PROCESSING METHOD, APPARATUS AND PROGRAM

(75) Inventors: Keiichi Ando, Tokyo (JP); Mizuki Hayakawa, Kawasaki (JP); Atsuko Ono, Kawasaki (JP); Koji Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 567 days.

(21) Appl. No.: 12/432,636

(22) Filed: Apr. 29, 2009

(65) Prior Publication Data

US 2009/0273816 A1 Nov. 5, 2009

(30) Foreign Application Priority Data

Apr. 30, 2008 (JP) .................................. 2008-118820

(51) Int. Cl.
*H04N 1/04* (2006.01)
(52) U.S. Cl. ........ 358/474; 358/497; 358/496; 382/165; 382/170
(58) Field of Classification Search .................. 358/474, 358/522, 529, 521, 486, 497, 496; 382/165, 382/171, 176, 170
See application file for complete search history.

(56) References Cited

U.S. PATENT DOCUMENTS

| | | | | |
|---|---|---|---|---|
| 5,245,445 A | * | 9/1993 | Fujisawa | 358/3.15 |
| 5,446,802 A | * | 8/1995 | Tada et al. | 382/170 |
| 6,118,895 A | | 9/2000 | Hirota et al. | |
| 6,954,284 B2 | * | 10/2005 | Enomoto | 358/1.18 |
| 7,492,474 B2 | * | 2/2009 | Wanda | 358/1.15 |
| 7,826,670 B2 | * | 11/2010 | Sugita | 382/232 |
| 8,009,931 B2 | * | 8/2011 | Li et al. | 382/289 |
| 8,010,550 B2 | * | 8/2011 | Duffy et al. | 707/764 |
| 8,049,908 B2 | * | 11/2011 | Shoda | 358/1.13 |
| 2006/0061830 A1 | * | 3/2006 | Sakakibara | 358/448 |
| 2009/0273816 A1 | * | 11/2009 | Ando et al. | 358/474 |

FOREIGN PATENT DOCUMENTS

| | | |
|---|---|---|
| JP | 08-130642 | 5/1996 |
| JP | 08-251402 | 9/1996 |

* cited by examiner

*Primary Examiner* — Negussie Worku
(74) *Attorney, Agent, or Firm* — Canon USA Inc. IP Division

(57) ABSTRACT

A method for processing an image obtained by reading an original plate on which at least one original is placed includes a determining step of determining whether the image is corresponding to one original or a plurality of originals placed on the original plate, an extracting step of extracting, from the image, one original image component corresponding to the one original or a plurality of original image components corresponding to the plurality of originals, and a processing step of performing image processing on the one or the plurality of extracted original image components, the image processing being different in accordance with the result of the determining step.

9 Claims, 5 Drawing Sheets

IMAGE PROCESSING METHOD, APPARATUS AND PROGRAM

BACKGROUND OF THE INVENTION

1. Field of the Invention

The present invention relates to an image processing method, an image processing apparatus and an image processing program for processing an image of an original plate on which at least one original is placed.

2. Description of the Related Art

A technique for automatically determining the category of an original placed on an original plate and switching processing to be performed in accordance with the category of the original has been known. In this technique, appropriate processing is performed in accordance with the category of an original. Specifically, processing for photograph originals is performed for photograph originals, and processing for document originals is performed for document originals.

For example, a method for determining the category of an original in accordance with the size of each object placed on an original plate is known. In addition, for example, a method for creating a histogram of a brightness signal obtained from each object placed on an original plate and determining the category of an original in accordance with the histogram is also known. Furthermore, a method in which a user explicitly specifies the category of an original is also known.

In a case where the category of an original is determined in accordance with the size of an object, since originals having the same size but having different categories exist, the determination is not performed correctly. In addition, in a case where the category of an original is determined in accordance with a histogram, the determination might not be able to be performed, depending on the contents of the original. There is a problem in that in a case where the accuracy in the determination of the category of an original is reduced, after the determination of the category of an original is performed, processing, such as image processing on an image of the read original and processing for switching a format used for storing the image in a file after the image processing is performed, might not be able to be performed appropriately.

In a case where image analysis of an object is performed in order to achieve more appropriate image determination, since, in general, processing for determining the category of an original is complicated, a long time is required for the determination processing.

SUMMARY OF THE INVENTION

According to an aspect of the present invention, a method for processing an image obtained by reading an original plate on which at least one original is placed includes a determining step of determining whether the image is corresponding to one original or a plurality of originals placed on the original plate, an extracting step of extracting, from the image, one original image component corresponding to the one original or a plurality of original image components corresponding to the plurality of originals, and a processing step of performing image processing on the one or the plurality of extracted original image components, the image processing being different in accordance with the result of the determining step.

Further features of the present invention will become apparent from the following description of exemplary embodiments with reference to the attached drawings.

DESCRIPTION OF THE EMBODIMENTS

First Embodiment

Figure 1:
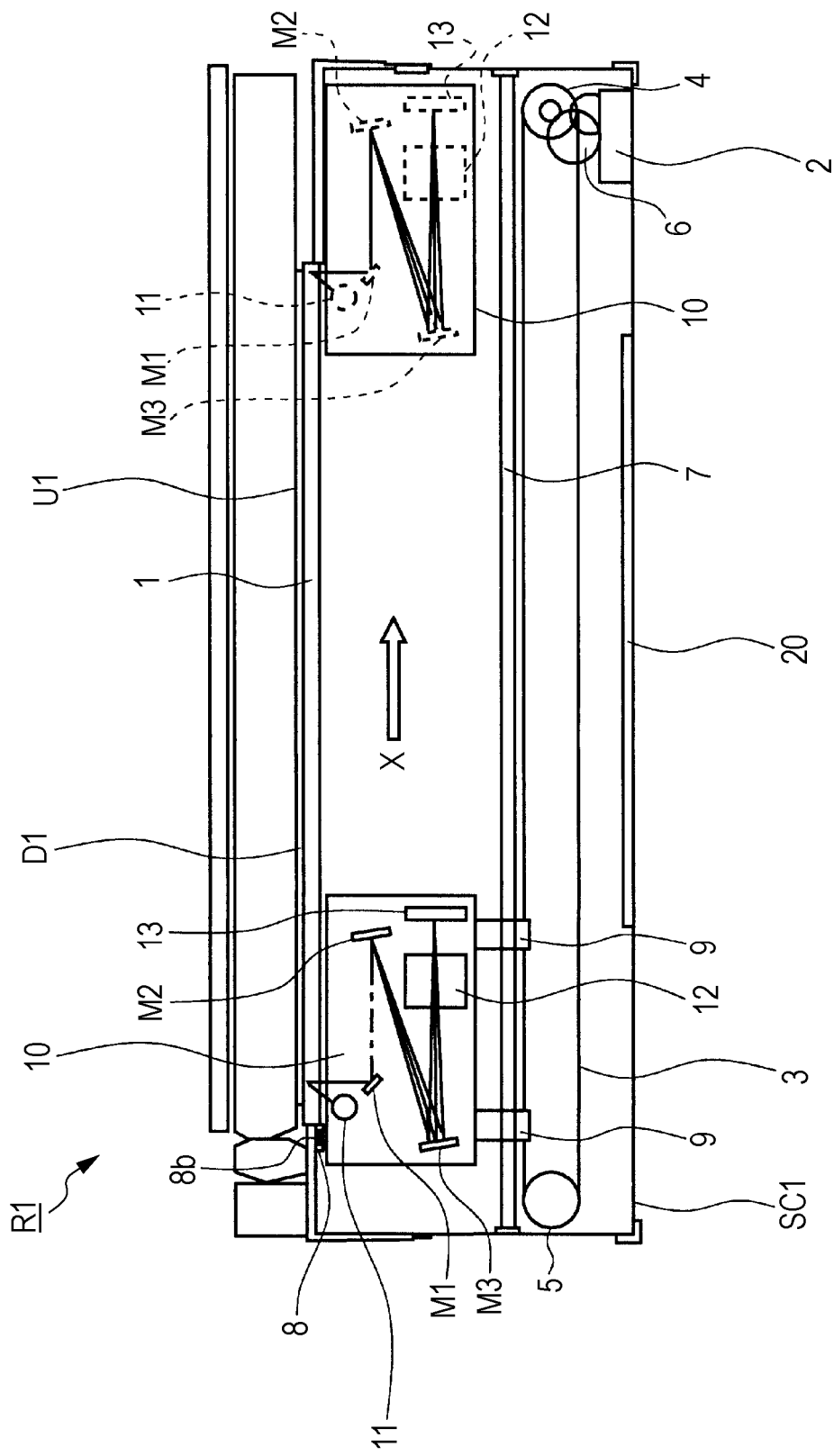
FIG. 1 is a sectional view of an image reading apparatus according to a first embodiment of the present invention.

FIG. 1 is a sectional view of an image reading apparatus R1 according to a first embodiment of the present invention. The image reading apparatus R1 includes a scanner SC1. The scanner SC1 is connected to a host computer through an interface cable (not illustrated).

The scanner SC1 includes an original plate glass 1, a pulse motor 2, an endless belt 3, pulleys 4 and 5, a gear train 6, a guide rail 7, a white reference plate 8, a mount 9, an optical unit 10, and an electric board 20. A black mark 8b is provided in the white reference plate 8. The scanner SC1 determines a read area on the basis of the black mark 8b, and reads an image. The pulse motor 2 and the optical unit 10 are electrically connected through a cable (not illustrated). The optical unit 10 is mounted on the mount 9 and is capable of sliding along the guide rail 7. The mount 9 is fixed on the endless belt 3. The optical unit 10 includes a light source 11, reflecting mirrors M1, M2, and M3, an imaging lens 12, and a line sensor 13 serving as an image capturing unit.

An operation for reading a reflection original image by the scanner SC1 will now be described. When the host computer issues a read instruction command, the scanner SC1 starts a reading operation. The scanner SC1 turns on the light source 11 of the optical unit 10. Light reflected from a read original D1 is reflected by the mirrors M1, M2, and M3. An image of the reflected light is formed on the line sensor 13 through the imaging lens 12. Accordingly, the scanner SC1 reads an image for one line in a main-scanning direction. The pulley 4 is rotated through the gear train 6 by using the power of the pulse motor 2, and the endless belt 3 is thus driven. Hence, the optical unit 10 fixed on the mount 9 moves along the guide rail 7 in a sub-scanning direction, which is represented by arrow X in FIG. 1. The scanner SC1 repeats operations for reading line images in the main-scanning direction while moving the optical unit 10 in the sub-scanning direction. The scanner SC1 moves the optical unit 10 while performing reading operations until reaching the position represented by dotted lines in FIG. 1. Accordingly, the entire original plate glass 1 is scanned. However, in accordance with the contents of the read command from the host computer, a partial image of an original on the original plate glass 1 is read. In this case, for the main-scanning direction, a system controller 21 (see FIG. 2) on the electric board 20 defines a pixel area that should be adopted from sensor outputs in accordance with a read image area designated by the host computer. In addition, for the sub-scanning direction, the system controller 21 on the electric board 20 defines a movement area of the optical unit 10, and a partial image of an original on the original plate glass 1 is read.

Figure 2:
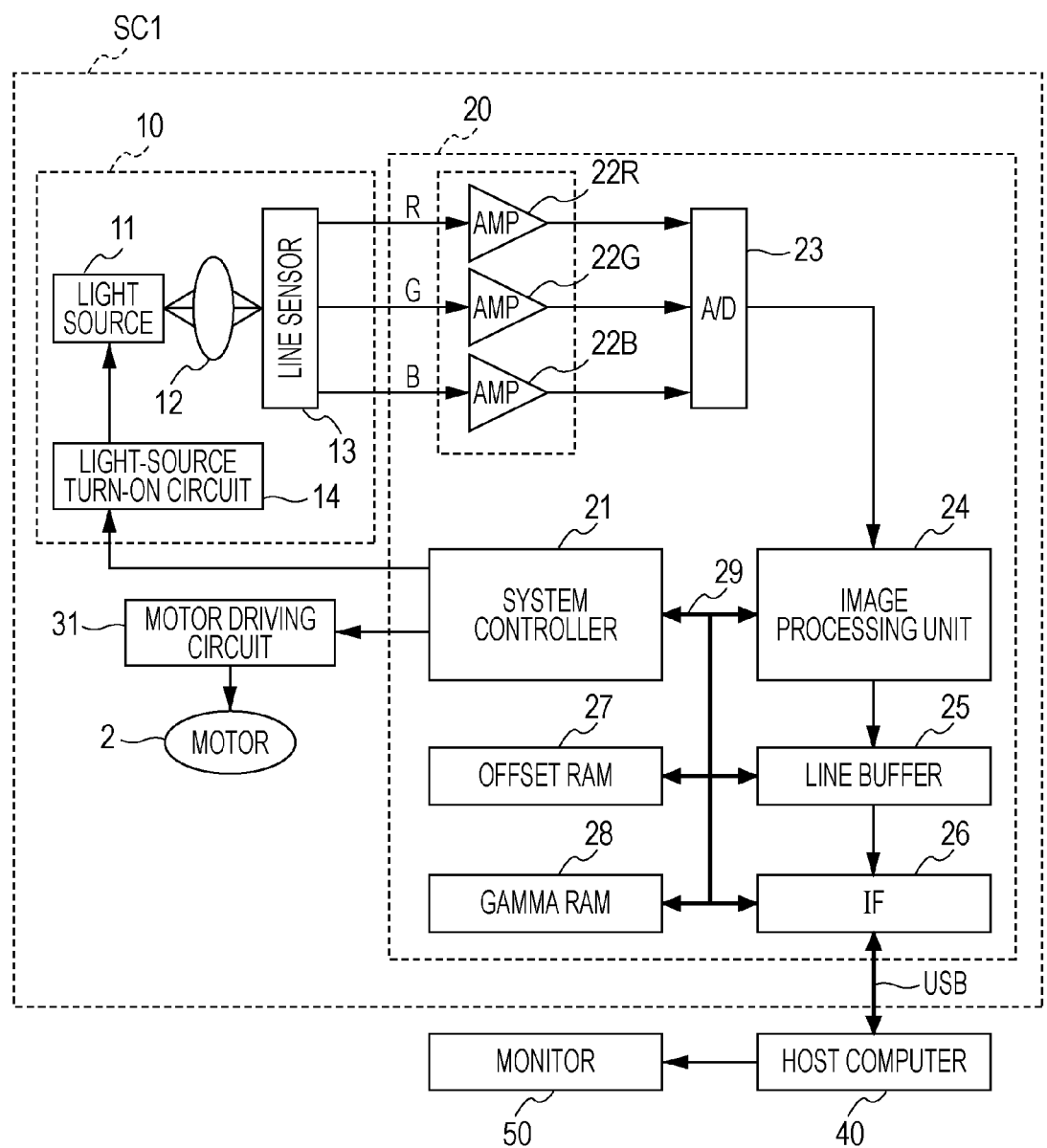
FIG. 2 is a block diagram showing an example of the functional configuration of a scanner in the first embodiment.

FIG. 2 is a block diagram showing an example of the functional configuration of the scanner SC1 in the first embodiment. In FIG. 2, the same components as those in FIG. 1 are denoted by the same reference numerals and the description of those same components will be omitted.

The scanner SC1 includes the optical unit 10, the electric board 20, the pulse motor 2, and a motor driving circuit 31. The optical unit 10 includes a light-source turn-on circuit 14. The light-source turn-on circuit 14 is a circuit for turning on the light source 11. The electric board 20 includes the system controller 21, analog gain controllers 22R, 22G, and 22B, an analog-to-digital (A/D) converter 23, an image processing unit 24, a line buffer 25, and an interface (IF) 26. The electric board 20 further includes an offset random-access memory (RAM) 27, a gamma RAM 28, and a central processing unit (CPU) bus 29. The image processing unit 24 performs image processing, such as offset correction, shading correction, digital gain control, color balance adjustment, masking, resolution conversion in the main and sub-scanning directions, and image compression, on a digitized image signal. The line buffer 25 includes a general-purpose random access memory and temporarily stores image data. The IF 26 communicates with a host computer 40. Here, the IF 26 is implemented by a universal serial bus (USB) interface.

The offset RAM 27 is a RAM used as a working area when image processing is performed. The offset RAM 27 is used for correcting offsets among RGB three lines. The offset RAM 27 also performs shading correction and the like and temporarily stores various data. Here, the offset RAM 27 is implemented by a general-purpose random access memory. The gamma RAM 28 is a RAM that stores a gamma curve and performs gamma correction.

The system controller 21 stores the sequence of the entire film scanner. The system controller 21 performs various control operations in accordance with instructions from the host computer 40. The system controller 21, the image processing unit 24, the line buffer 25, the IF 26, the offset RAM 27, and the gamma RAM 28 are connected through the CPU bus 29. The CPU bus 29 includes an address bus and a data bus. The motor driving circuit 31 is used for the pulse motor 2. The motor driving circuit 31 outputs an excitation switching signal for the pulse motor 2 in accordance with a signal from the system controller 21 of the scanner SC1.

Figure 3:
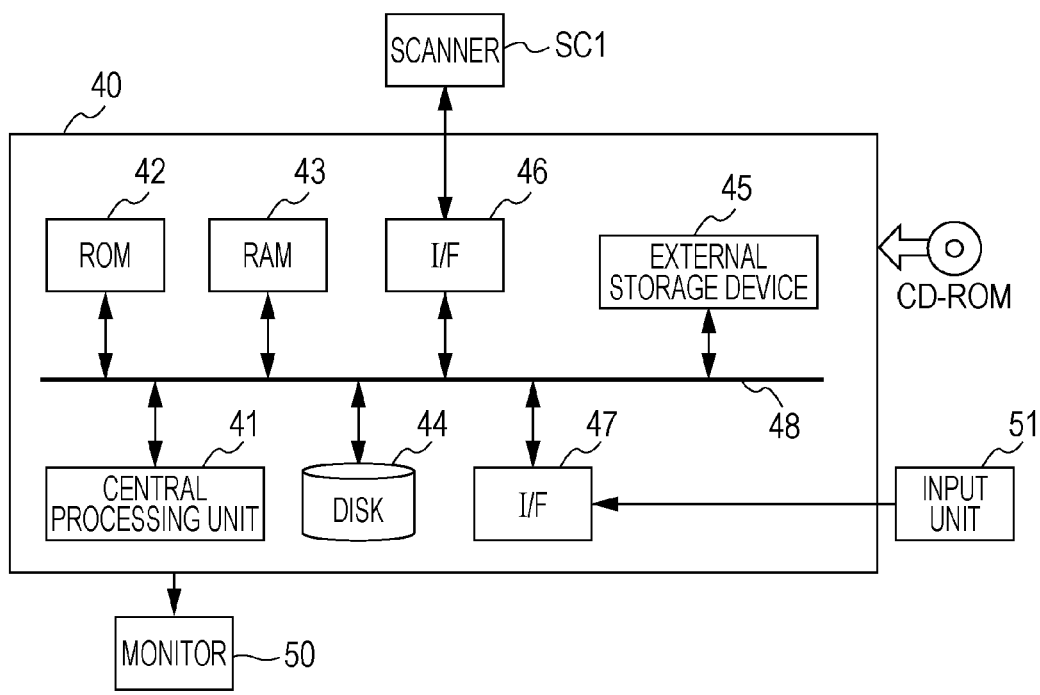
FIG. 3 schematically shows an example of the configuration of a host computer used for control of the scanner in the first embodiment.

FIG. 3 schematically shows an example of the configuration of the host computer 40 generally used for control of the scanner SC1 in the first embodiment. The host computer 40 includes a central processing unit 41, a read-only memory (ROM) 42, a RAM 43, a disk device 44, an external storage device 45, an I/F 46, an I/F 47, and a bus 48. A monitor 50 is connected to the host computer 40.

The central processing unit 41 performs processing in accordance with a program stored in the ROM 42. The ROM 42 stores a program implementing a process shown by a flowchart of FIG. 4. The RAM 43 provides a storage area and a work area necessary for the process performed in accordance with the program. The I/F 46 is an interface that communicates with the scanner SC1. As with the IF 26 of the scanner SC1, the I/F 46 is implemented by a USB interface. However, a different interface, such as IEEE 1394, may be employed for the I/F 46.

The I/F 47 is connected to an input unit 51 including a mouse, a keyboard, and the like. The external storage device 45 drives an external storage medium, such as a floppy (registered trademark) disk or a compact disc read-only memory (CD-ROM). In a case where a control program is stored in an external storage medium instead of being stored in advance in the ROM 42, the I/F 47 reads the program and downloads the read program. Note that the control program may be downloaded through a network by using a network connector (not illustrated). The bus 48 connects the components described above, so that data can be transferred among the components.

Figure 4:
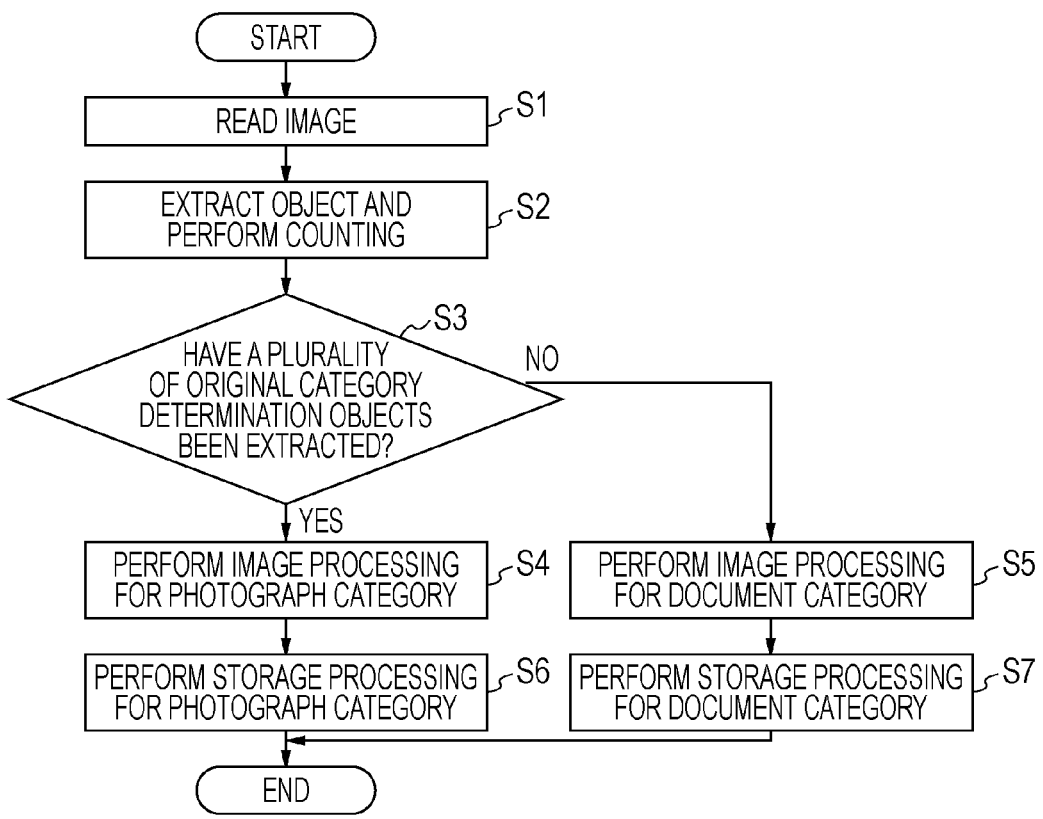
FIG. 4 is a flowchart showing a reading process performed by the scanner under the control of the host computer in the first embodiment.

FIG. 4 is a flowchart showing a reading process performed by the scanner SC1 under the control of the host computer 40 in the first embodiment.

Figure 5A:
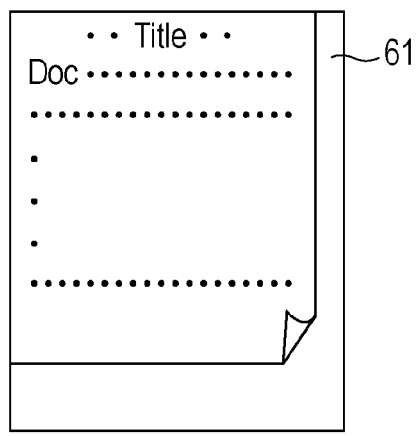
FIG. 5A illustrates an image read when a magazine original is placed.
Figure 5B:
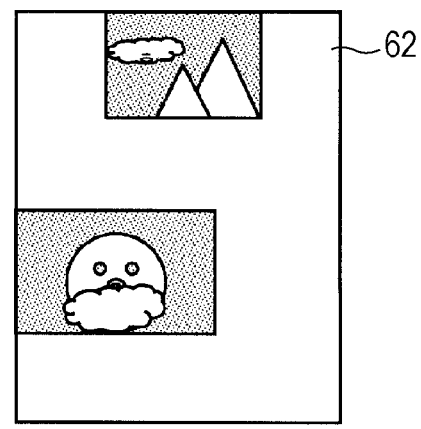
FIG. 5B illustrates an image read when a plurality of photograph originals are placed.

In step S1, the scanner SC1 reads a read original D1 placed on the original plate glass 1, and transmits data of the read original D1 through the IF 26 to the host computer 40. In terms of an image reading area, full-screen scanning in which the entire readable area within the original plate glass 1 is read may be performed. Alternatively, partial scanning in which only a read area designated by the host computer 40 is read may be performed. The read original D1 placed on the original plate glass 1 may be a single original that covers the entire readable area within the original plate glass 1 or a plurality of originals that are placed in a scattered manner over the readable area within the original plate glass 1. FIG. 5A illustrates an image 61 that is read when a magazine original is placed. FIG. 5B illustrates an image 62 that is read when a plurality of photograph originals are placed.

In step S2, one object or a plurality of objects are extracted from the image, and the number of extracted objects is counted. A specific example of counting the number of extracted objects will be described later with reference to a flowchart of FIG. 6.

In step S3, it is determined whether a plurality of objects have been extracted. The category of the original is determined in accordance with the number of extracted objects. In a case where one object has been extracted, the "category of an original" is determined to be a document. Meanwhile, in a case where a plurality of objects have been extracted, the "category of an original" is determined to be a photograph. For convenience, the category of an original is defined as a document or a photograph. However, the category of an original does not represent the contents of an image captured in the host computer 40.

In step S4, image processing for a photograph category is performed. The "image processing for a photograph category" includes one or more image correction operations. That is, backlight correction is performed for photograph images. Face detection correction and red-eye correction are performed for person's images. Image processing such as moire reduction correction, processing for changing the size of an original, and the like are performed for printing images. In a case where these processing operations are performed in a parallel manner at the same time or performed in an exclusive manner, the parallel and exclusive manners can be combined.

In step S5, image processing for a document category is performed. The "image processing for a document category" includes one or more image correction operations. Unsharp mask correction for causing a character to stand out, image processing such as moire reduction correction for printing images, processing for changing the size of an original, and the like are performed. In a case where these processing operations are performed in a parallel manner at the same time or performed in an exclusive manner, the parallel and exclusive manners can be combined.

In step S6, image storage processing for the photograph category is performed. The image storage processing for the photograph category is processing for performing conversion of a storage format when processed data is stored in a storage medium. In the image storage processing, the processed data is stored in an image storage format (Joint Photographic Experts Group (JPEG), Tagged Image File Format (TIFF), or bitmap (BMP)).

In step S7, image storage processing for the document category is performed. The image storage processing for the document category is processing for performing conversion of a storage format when processed data is stored in a storage medium. In the image storage processing, the processed data is stored in a document storage format (portable document format (PDF), document (DOC), or text (TXT)). The image storage processing for the document category may include not only processing for performing conversion of a storage format but also processing for detecting text information indicating the contents of an original, adding the detected text information to the data in accordance with a document file format in which addition of text information can be performed, and performing storage processing.

A method for extracting an object will be specifically explained with reference to a flowchart of FIG. 6.

In step S11, the resolution of an image to be analyzed is converted into a low resolution. This resolution conversion is performed so that image processing in step S12 and the subsequent steps can be performed at high speed. Thus, the processing of step S11 may be omitted.

In step S12, a threshold value for binarization is determined in accordance with the image. An optimal threshold value can be determined by analyzing the luminance level or the intensity level of pixels around an object pixel. In the case of easily determining a threshold value, a fixed value is determined in advance.

In step S13, binarization of the image is performed in accordance with the threshold value determined in step S12. Binarization for extracting an object is performed for all the pixels. Here, the position of a certain pixel is identified by using the X and Y coordinates. At the start of processing, the X and Y coordinates are initialized to an initial value (in general, 0). Every time a pixel is processed, the X and Y coordinates are changed. Accordingly, all the pixels are scanned.

In step S14, noise appearing as an isolated point is removed from the image binarized in step S13. A pixel determined to be white by the binarization in step S13 is eliminated from the object. In noise reduction, a pixel determined to be black by the binarization that has a size smaller than or equal to a specific size is also eliminated from the object. Here, in particular, in the case of a paper original or the like having a high degree of whiteness, edge portions of an end of the original may not be continued in accordance with a result of binarization. However, by enhancing the continuity of black pixels, processing for including the edge portions into the object is performed. The processing for including the edge portions into the object may be performed together with the binarization in step S13.

In step S15, the inside the object is filled with black. Although the object is determined by removing noise from black pixels obtained in the binarization in step S14, the shape of the black pixel area determined to be the object is checked. In a case where a certain object includes another object, the whole inside of the certain object is filled with black so that the entire certain object is regarded as an object. For example, in a case where a photograph is scanned, if a background portion of the photograph is bright and only an outer edge portion of the photograph and an object in the photograph are determined to be black pixels by binarization, the whole inside of the photograph is filled with black.

In step S16, a result is stored. The result stored in step S16 is indication of an object or a non-object. The indication of an object is represented as 1 and the indication of a non-object is represented as 0. Since, as a result of the binarization in step S12 and the subsequent steps, encoding is performed in such a manner that black is represented as 1 and white is represented as 0, such a result can be directly used.

In step S17, consecutive regions in the obtained object are counted as a single object. Here, at the start of processing, the X and Y coordinates are initialized to an initial value (in general, 0) and the number of objects is set to 0. In a case where the X and Y coordinates are changed from the initial value, processing is performed for each pixel, and it is determined that an object pixel exists, the counted number of objects is increased while an object region following the object pixel is eliminated from a pixel to be processed. The X and Y coordinates of a pixel eliminated from the pixel to be processed are changed, and all the pixels are scanned. The number of objects obtained after all the pixels are scanned is the total number of objects included in the entire image.

Although the size of an extracted object is not limited, in a case where the size of an area that can be read by the scanner SC1 is limited, there may be a limitation in that an object whose size is not the same as the size of the readable area is not counted. Specific examples of limitations on the size of the readable area include a case where the aspect ratio of an object is set to be equal to or greater than a predetermined ratio and a case where the minimum size of an object is set. In a case where the limitation on the size of a readable area is imposed, a high-performance counting function in which an image portion that is a noise component contained in an image captured in the host computer 40 in step S1 and that should not be originally extracted is not falsely recognized as a read original D1, can be achieved.

Figure 6:
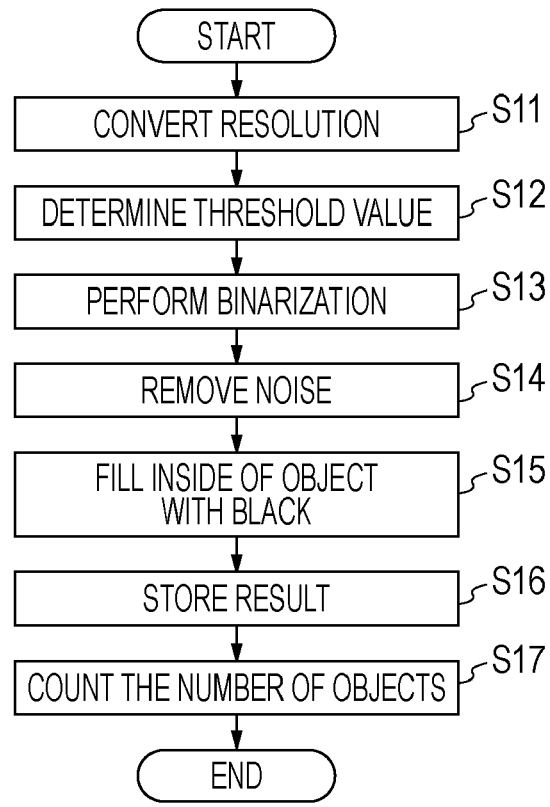
FIG. 6 is a flowchart showing a process to extract an object.

In the first embodiment, the process is performed in the order described by the flowchart shown in FIG. 6. However, if noise reduction in step S14 is performed prior to the binarization in step S13, an appropriate result may be obtained. Thus, the processing order of the flowchart may be changed where necessary.

An image portion extracted as an object in a case where object extraction described in steps S11 to S17 is performed will be described with reference to FIGS. 5C to 5F.

Figure 5C:
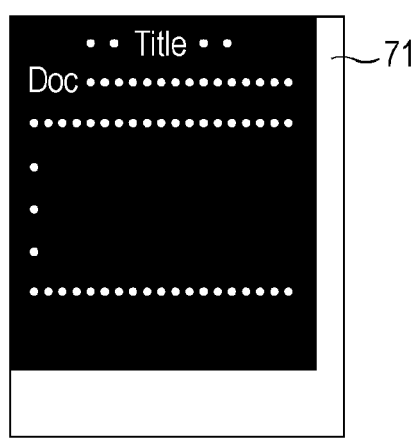
FIG. 5C illustrates a binarization result obtained in a case where a magazine original is placed.
Figure 5D:
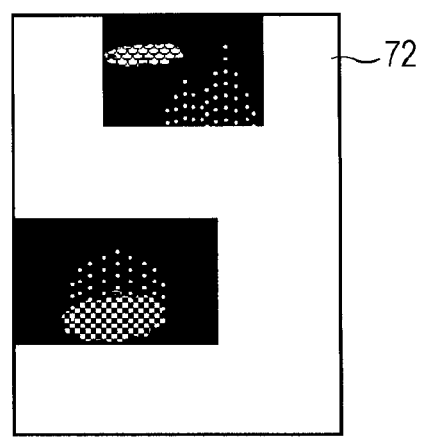
FIG. 5D illustrates a binarization result obtained in a case where a plurality of photograph originals are placed.

FIG. 5C illustrates a binarization result 71 obtained in a case where a magazine original is placed. FIG. 5D illustrates a binarization result 72 obtained in a case where a plurality of photograph originals are placed. In FIGS. 5C and 5D, areas filled with black are areas determined to be objects by binarization.

Figure 5E:
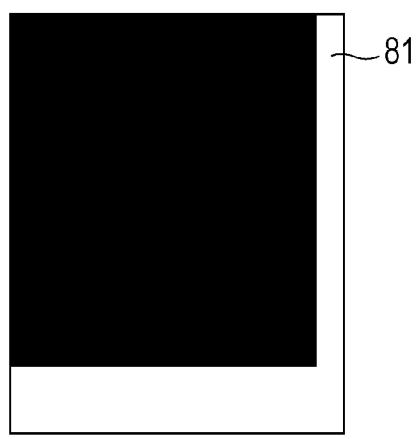
FIG. 5E illustrates an extraction result obtained in a case where a magazine original is placed.
Figure 5F:
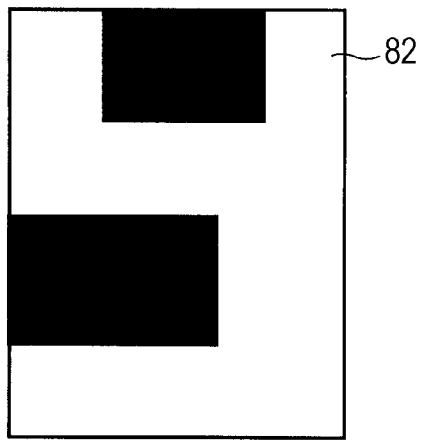
FIG. 5F illustrates an extraction result obtained in a case where a plurality of photograph originals are placed.

FIG. 5E illustrates an extraction result 81 obtained in a case where a magazine original is placed. FIG. 5F illustrates an extraction result 82 obtained in a case where a plurality of photograph originals area placed. In FIGS. 5E and 5F, areas filled with black are extracted as objects.

Second Embodiment

A second embodiment is obtained by improving the accuracy in the determination of the category of an original in the first embodiment.

Figure 7:
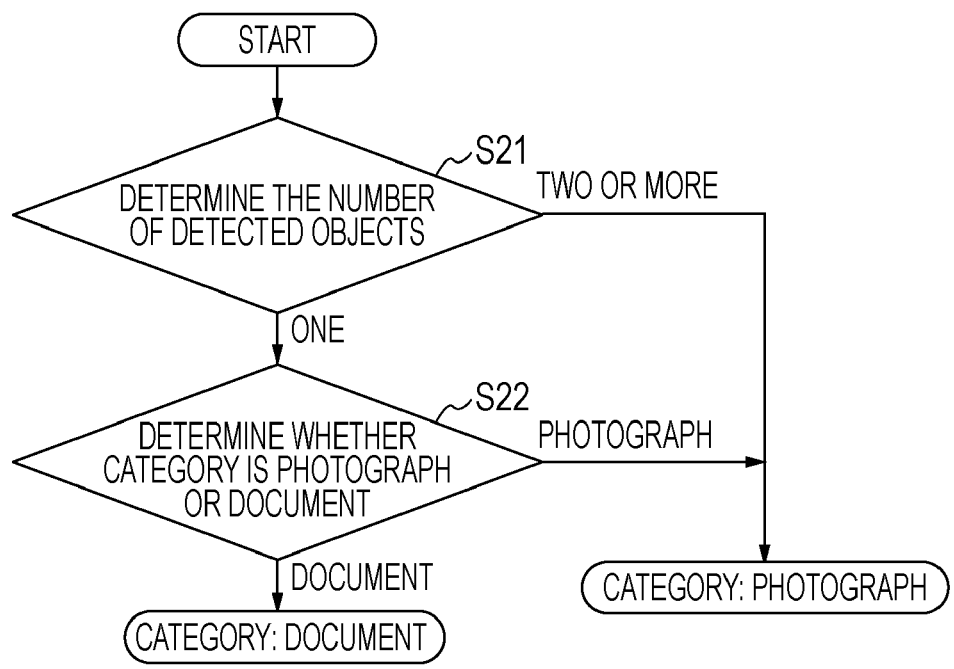
FIG. 7 is a flowchart showing another determination process performed in a case where it is determined that one original exists.

FIG. 7 is a flowchart of a process to determine, in a case where it is determined that one original exists, whether the original is a photography category or a document category in accordance with a method different from the above-described method for determining the number of originals.

In step S21, the number of extracted objects is determined. In a case where a plurality of objects have been extracted, it is determined that the category of the original is a photograph.

In a case where it is determined that one object has been extracted, in step S22, it is determined whether the category of the original is a photograph or a document, in accordance with one or more different parameters (the size of an original, presence or absence of a dot, the arrangement, and the like).

More specifically, in a case where it is determined whether the category of an original is a photograph or a document in accordance with the size of the original, it is determined that the category of the original is a photograph when the size of the original is smaller than or equal to an L size and it is determined that the category of the original is a document when the size of the original is greater than the L size. Although the determination is performed in accordance with the L size in this example, the reference size may be greater or smaller than the L size. Furthermore, the reference size is not necessarily fixed to a constant size. The reference size may be changed in accordance with a setting.

The example in which the category of an original is determined in accordance with the size of the original has been described. However, the number of parameters used in step S22 is not necessarily limited as long as the parameters can be used for determination. When one or more parameters are used, the accuracy in the determination differs in accordance with the order of the parameters used in the determination process. Hence, for example, by performing the process in accordance with the order of "checking of the size of an original, detection of a dot, and arrangement on a butt member", the accuracy in the determination of the category of an original is increased.

After the category of an original is determined, a plurality of processes may be selectively performed, as in the first embodiment.

Third Embodiment

A third embodiment of the present invention is obtained by further increasing the determination accuracy in a case where a single original in the photograph category is scanned in the first and second embodiments.

In a case where only one original in the photograph category is desired to be scanned, by placing the original together with a dummy original so that it is always determined that the category of the original is a photograph category, the determination of the photograph category can be reliably achieved. That is, in a case where only a single photograph original is placed on the original plate glass 1 in the first embodiment, since only the original exists, it is determined that the category of the original is a document category. In order to avoid such an erroneous determination and in order that it is determined that the category of the original is a photograph category, two originals, which includes a dummy original, are placed on the original plate glass 1.

The present invention can be adapted to a system constituted by a plurality of apparatuses (for example, a host computer, an interface apparatus, a scanner, a printer, a multifunction apparatus, and the like). An aspect of the present invention can be realized when a storage medium on which program code of software which realizes the functions in the above-described embodiments are stored is supplied to a system or an apparatus and a computer (or a CPU or a microprocessing unit (MPU)) of the system or the apparatus reads the program code stored in the storage medium and executes the read program code.

In general image reading apparatuses, an original plate often has A4 size. Thus, there is a limitation on an area in which an original is placed. In the case of image reading apparatuses having an original plate whose size is at most A4 size, a plurality of document originals of A4 size or B5 size, which are generally available, cannot be placed on the original plate. In addition, in general, for reading photograph originals, since a plurality of photographs can be placed on the original plate, a plurality of photographs are placed on the original plate and the plurality of photographs are read in a single reading operation in order that the number of reading operations is reduced. Thus, the category of an original can be easily identified by determining whether or not a plurality of originals exists. Therefore, an appropriate process can be performed in accordance with a reliable determination result.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-118820 filed Apr. 30, 2008, which is hereby incorporated by reference herein in its entirety.

What is claimed is:

1. A method for causing a device including at least one processor communicatively-coupled to a memory via a bus to process an image obtained by reading an original plate on which at least one original is placed, the method comprising:
   a determining step of determining whether the image is corresponding to one original or a plurality of originals placed on the original plate;
   an extracting step of extracting, from the image, one original image component corresponding to the one original or a plurality of original image components corresponding to the plurality of originals;
   a processing step of performing image processing on the one or the plurality of extracted original image components, the image processing being different in accordance with the result of the determining step; and
   an output step of outputting at least one image data, each of which corresponds to each of the one or the plurality of extracted original image components processed in the processing step, as document data obtained by reading the at least one original.

2. A non-transitory computer-readable storage medium, storing a computer-executable, the computer-executable process causing a computer to execute the method according to claim 1.

3. A method for causing a device including at least one processor communicatively-coupled to a memory via a bus to process an image obtained by reading an original plate on which at least one original is placed, the method comprising:
   a determining step of determining whether the image contains only one original image component or a plurality of original image components;
   an extracting step of extracting, from the image, the one original image component or the plurality of original image components;
   a processing step of performing image processing for a photograph image on the plurality of extracted original image components in a case where a plurality of original image components are contained in the image, and performing image processing for a document image on the one extracted original image component in a case where one original image component is contained in the image; and an output step of outputting at least one image data, each of which corresponds to each of the one or the plurality of extracted original image components processed in the processing step, as document data obtained by reading the at least one original.

4. The method according to claim 3, wherein in the image processing for the photograph image and the image processing for the document image, conversion into different file formats is performed.

5. The method according to claim 4, wherein the file format into which the conversion for the document image is performed is a file format in which text data indicating the contents of the original is capable of being added to data of the extracted image.

6. The method according to claim 5, wherein in the image processing for the document image, by generating text information on the contents of the extracted image and adding the generated text information to the data of the extracted image, the conversion into the file format for the document image is performed.

7. The method according to claim 3, wherein
the image processing for a photograph image includes at least one of backlight correction, face detection correction, red-eye correction, moire reduction correction, and processing for changing a size, and
the image processing for a document image includes at least one of, unsharp mask correction for causing a character to stand out, moire reduction correction and processing for changing a size of an original.

8. A method for causing a device including at least one processor communicatively-coupled to a memory via a bus to process an image obtained by reading an original plate on which at least one original is placed, the method comprising:
a first determining step of determining whether the image contains only one original image component or a plurality of original image components;
a second determining step of determining, in a case where the one original image component is contained in the image, whether the original is a photograph or a document;
an extracting step of extracting, from the image, the one original image component or the plurality of original image components;
a processing step of performing image processing for a photograph original on the plurality of extracted original image components in a case where it is determined in the first determining step that a plurality of original image components are contained in the image and on the one extracted original image component in a case where it is determined in the second determining step that the original is a photograph, and performing image processing for a document original on the one original image component in a case where it is determined in the second determining step that the original is a document; and
an output step of outputting at least one image data, each of which corresponds to each of the one or the plurality of extracted original image components processed in the processing step, as document data obtained by reading the at least one original.

9. An image processing apparatus that performs processing on an image obtained by reading an original plate on which at least one original is placed, the image processing apparatus comprising:
a determination unit configured to determine whether the image contains only one original image component or a plurality of original image components;
an extraction unit configured to extract, from the image, the one original image component or the plurality of original image components;
a processing unit configured to perform image processing for a photograph image on the plurality of extracted original image components in a case where a plurality of original image components are contained in the image and perform image processing for a document image on the one extracted original image component in a case where one original image component is contained in the image; and
an output unit configured to output at least one image data, each of which corresponds to each of the one or the plurality of extracted original image components processed by the processing unit, as document data obtained by reading the at least one original.

* * * * *